Figure 1:
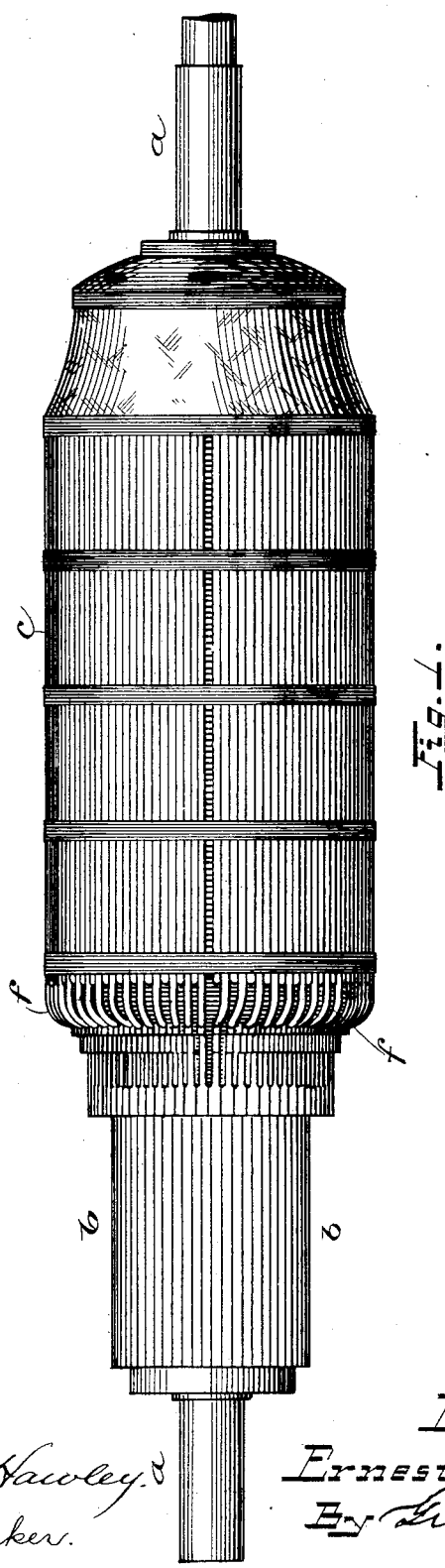

(No Model.) 4 Sheets—Sheet 1.
E. P. WARNER.
ARMATURE WINDING FOR DYNAMO ELECTRIC MACHINES.

No. 483,729. Patented Oct. 4, 1892.

Witnesses.
Charles G. Hawley.
George R. Parker.

Inventor.
Ernest P. Warner.
By _____
Attorney.

(No Model.) 4 Sheets—Sheet 2.

E. P. WARNER.
ARMATURE WINDING FOR DYNAMO ELECTRIC MACHINES.

No. 483,729. Patented Oct. 4, 1892.

Witnesses.
C. G. Hawley.
Geo. R. Parker.

Inventor.
Ernest P. Warner.
By George P. Barton
Attorney.

(No Model.) 4 Sheets—Sheet 3.
E. P. WARNER.
ARMATURE WINDING FOR DYNAMO ELECTRIC MACHINES.

No. 483,729. Patented Oct. 4, 1892.

Witnesses.
Charles G. Hawley.
George R. Parker.

Inventor.
Ernest P. Warner
By George M. ——
Attorney.

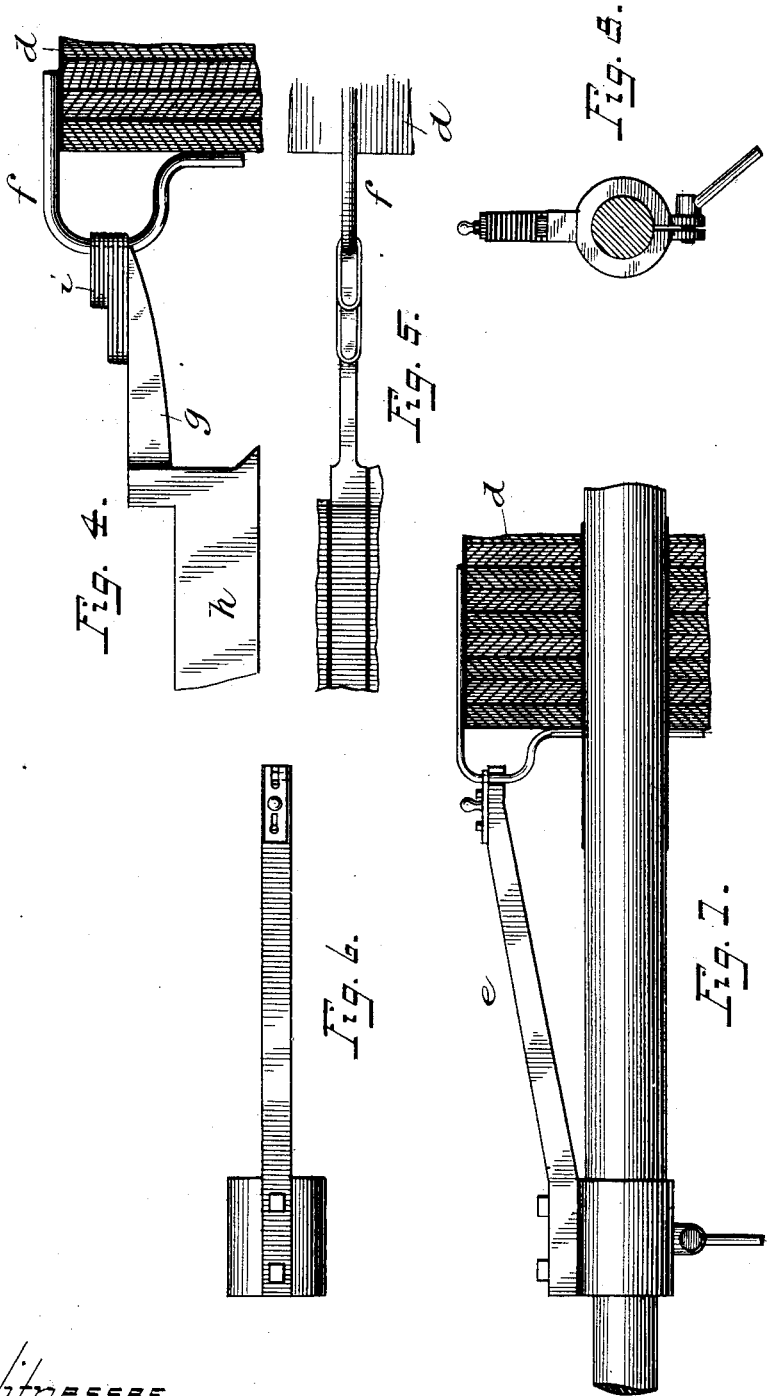

UNITED STATES PATENT OFFICE.

ERNEST P. WARNER, OF CHICAGO, ILLINOIS, ASSIGNOR TO THE WESTERN ELECTRIC COMPANY, OF SAME PLACE.

ARMATURE-WINDING FOR DYNAMO-ELECTRIC MACHINES.

SPECIFICATION forming part of Letters Patent No. 483,729, dated October 4, 1892.

Application filed September 30, 1889. Serial No. 325,543. (No model.)

*To all whom it may concern:*

Be it known that I, ERNEST P. WARNER, a citizen of the United States, residing at Chicago, in the county of Cook and State of Illinois, have invented a certain new and useful Improvement in Armature-Windings for Dynamo-Electric Machines, (Case No. 25,) of which the following is a full, clear, concise, and exact description, reference being had to the accompanying drawings, forming a part of this specification.

In the manufacture of dynamo-electric machines having a low electro-motive force and strong current it is of the greatest importance to avoid soldered splices or joints and to arrange the wires symmetrically about the core and to make the connections between the different coils and the different segments of the commutator strong and perfect and of high conductivity. Heretofore it has been usual to wind the coils of the armature separately—that is, of separate pieces of wire—and afterward make the proper connections between the wires and with the commutator-segments. In this class of machines every connection of joint thus introduced into the circuit is a possible source of trouble.

By my invention I am enabled to place the coils symmetrically upon the armature with only two joints or soldered connections in the entire system of winding and connecting together of the coils, the different coils being extended at one end in a form especially adapted to facilitate the connections with the commutator-segments.

My invention consists in forming the coils of the armature from two separate wires, a convolution or convolutions forming a coil being first wound on from one wire and then an equal amount forming the second coil being wound on from the other wire, the operation being repeated in reciprocal succession until the armature is filled. The two wires after the winding is completed are soldered together, so that the coils are made to consist of one continuous conductor having only two joints therein. Each portion of this conductor will contain the same number of convolutions, and at the commutator end of the armature loops are formed by bending out the wire of each convolution on one side of the armature. These loops, being bared of insulation, are adapted to be connected each with a different commutator-segment.

My invention consists, also, in bending the coils at the end of the armature next to the commutator, as hereinafter described, so as to facilitate making the connections between the coils and the segments, the tangs or connections from the different segments being preferably formed in steps, as will be more particularly described.

My invention is illustrated in the accompanying drawings, in which—

Figure 2:
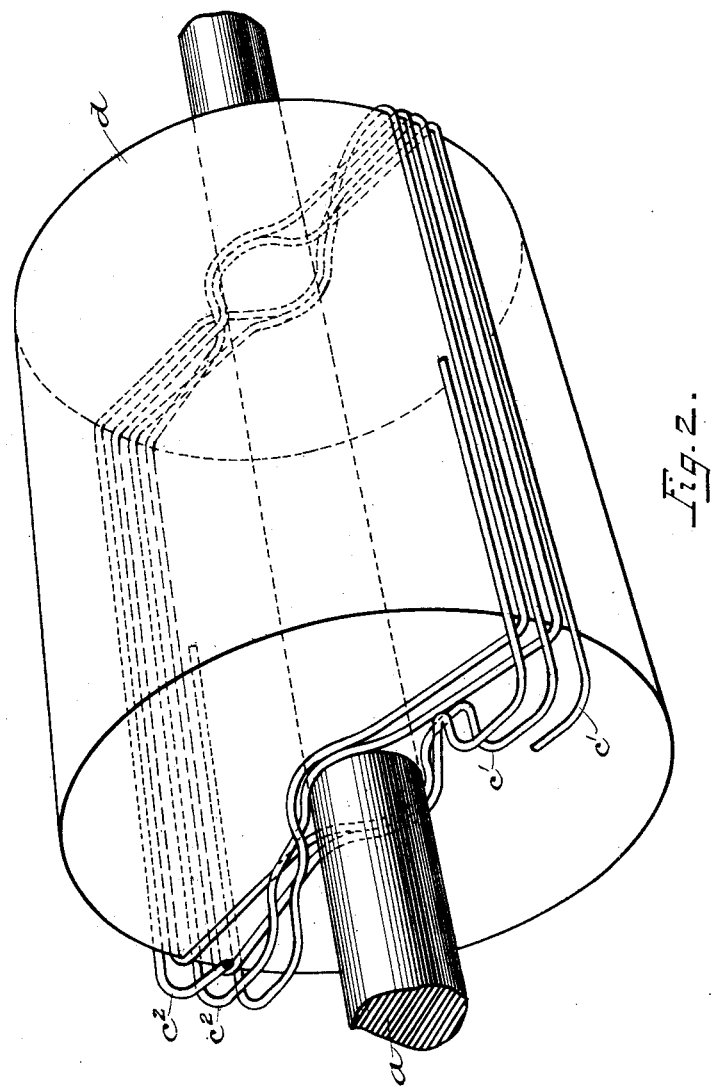
Figure 3:
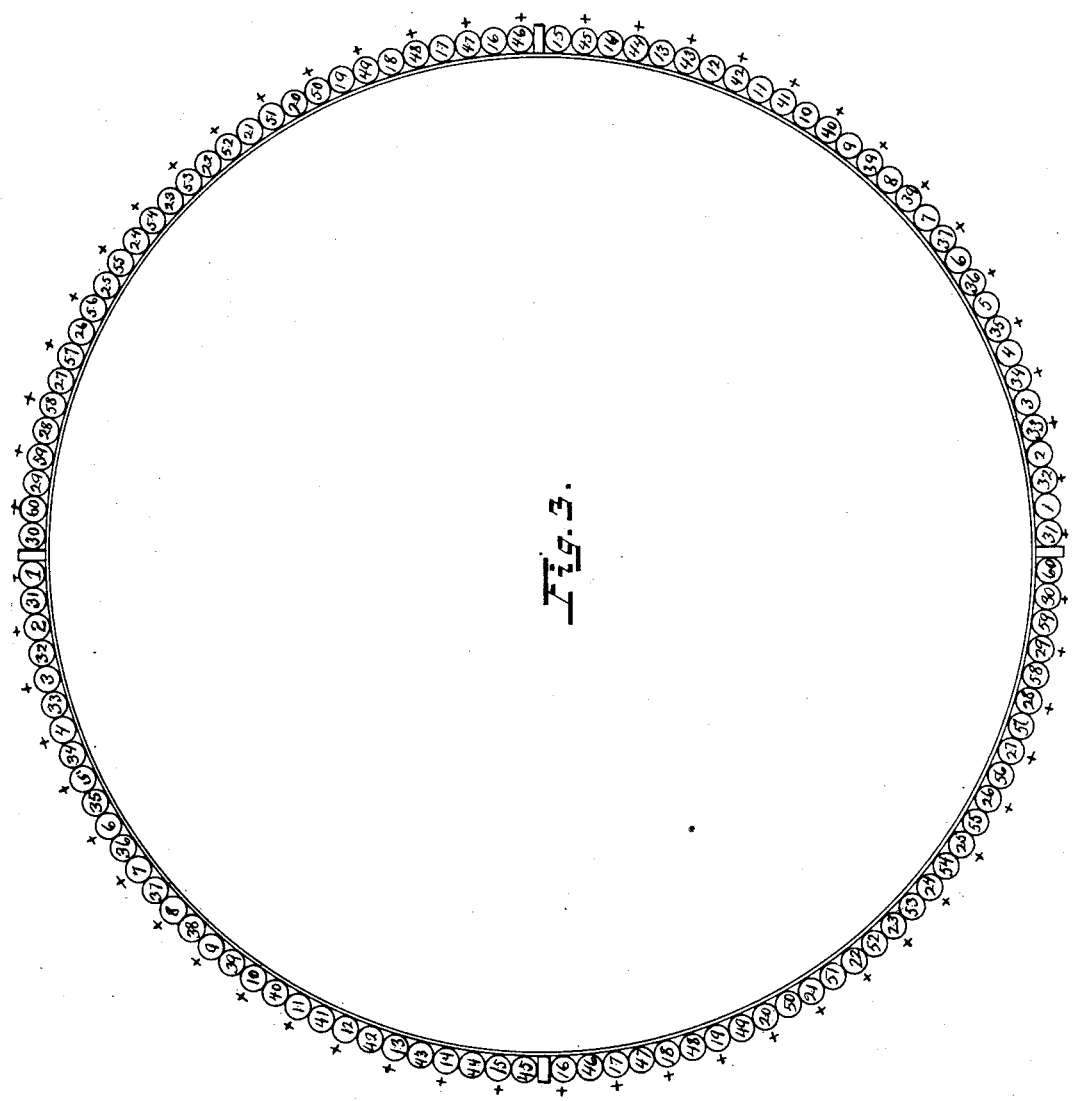

Figure 1 is a side elevation of an armature and commutator embodying my invention. Fig. 2 is a perspective view illustrative of the positions of the coils upon the armature. Fig. 3 is a diagram illustrative of the manner of placing the different coils formed from the two wires upon the armature and their relative positions. Fig. 4 is a detailed side view showing the manner of forming the connection between a coil and one of the commutator-segments. Fig. 5 is a plan of Fig. 4. Fig. 6 is a plan of the tool used in making the bend or loop for connection with the commutator-segment. Fig. 7 is a side elevation showing the tool in position to hold the bend or loop formed in the wire in proper position with respect to the shaft and core of the armature. Fig. 8 is an end elevation of the tool, showing the shaft of the armature in section.

Like parts are indicated by similar letters and numerals of reference throughout the different figures.

Upon the shaft $a$ of the armature are mounted the commutator $b$ and the coils $c$. These coils are wound upon the core $d$.

I will first describe the manner of winding the coils upon the core. We will assume that there are two spools or reels of insulated wire from which the coils are to be formed. The armature-core may be made up of iron rings, these rings or annuli being placed about a common shaft, this being the shaft of the armature. The circumference of the cylinder thus formed may be divided into quadrants by projecting lugs extending radially from notches provided in the core, these lugs serving as carriers for the coils. It will be understood that the particular number of convolutions in each coil and the number of coils may be varied as circumstances may require. I have, however, illustrated an armature having sixty coils, each coil consisting of a single turn of wire. Counting entirely around the armature we should have then one hundred and twenty wires about its circumference, each turn occupying two spaces—that is to say, one space on each side of the armature.

As a matter of convenience in forming the coils I start at the end of the armature to which the commutator is to be attached, and, laying the end of one wire in proper position, proceed to wind on one convolution or one coil therefrom, this coil being bent in proper position as it comes back to the commutator end and being then secured and held fast in proper position by the tool, as shown in Fig. 7. I am now ready to wind on a coil from the second wire. To do this, I begin at the same end of the armature as before, but at a point diametrically opposite the place of beginning with the first wire. I place the end of the second wire in proper position and proceed to wind on the same length of wire as in the first instance, and, coming back to the end of the armature next to the commutator, I release the first coil from the tool, and, swinging it half-way around, hold the second coil in position while forming the bend where the connection is to be made with the commutator-segment. This operation is repeated alternately, taking the wire first from one reel and then from another until the winding is complete, whereupon the finishing ends of the two wires will be reciprocally joined to their beginning ends, so as to complete the winding in one continuous circuit, this circuit having only two joints therein.

As illustrated in Fig. 3, the wires marked + may be considered as those bent for attachment to the commutator-segments. In forming the coils I might start conveniently with the wire 1 at the left of the lug at the top of the sheet, as shown in Fig. 3. This wire we will consider as represented by wire $c'$ of Fig. 2. Thus wire being passed around the armature is brought back across the end near the place of beginning, as indicated by $c'$ in Fig. 2 and by 1 at the second space to the right of the lug at the bottom of the sheet in Fig. 3. This coil, as indicated by the spaces marked 1 in Fig. 3 and by the letters $c'$ $c'$ in Fig. 2, being thus wound on, we then proceed to wind on a second coil from the other wire. Starting in then at the space marked 31 to the right of the lug at the bottom of the sheet of Fig. 3 in the position indicated by the end of the wire marked $c^2$ in Fig. 2, said second coil $c^2$ is wound about the core, passing into the second space to the left of the lug at the top of the sheet, said space being marked 31, thus passing entirely around the core, as indicated more clearly in Fig. 2. After each turn from each wire a bend is made by aid of the forming-tool $e$, as shown more clearly in Fig. 7.

This operation of winding is continued in reciprocal succession, one coil being formed from one wire and the succeeding coil from the other, until the armature is full. The two joints are then made as before described. We have then the armature with the coils wound upon the core thereof, these coils being provided with bends $f$. There being sixty coils, the commutator would consist of sixty segments, and these segments are connected each with its appropriate coil and each with a different bend $f$, as shown more clearly in Figs. 4 and 5. The tang $g$, it will be observed, has a sufficient cross-section throughout its entire length, so that no objectionable resistance may be introduced into the circuit and so that it will be strong and sufficient to form the connection between the segment $h$ and the bend $f$. The final connection between the bend $f$ and the tang $g$ is preferably made by wrapping bare wire $i$ about the bared bend, the insulation having been removed from the bend where the wire $i$ is wrapped around the same.

By making two or more steps, as shown, I provide suitable means for holding the wire $i$ in place without reducing the cross-section of tang $g$ unduly, while at the same time the tang is shaped so as not to encroach upon the space occupied by the crossing wires at the end of the core.

It will be observed that it is the special construction of the tang with steps which enables me to preserve the cross-section and at the same time leave space below the same for the crossing wires of the armature-coils.

The wire $i$ forms a lashing about the different steps and comes directly in contact with the shoulders forming said steps and the bared surface of the bend $f$. Thus each convolution of the wire $i$ makes a connection with the tang and with the bend, which after the wire $i$ is in position is soldered to hold the convolutions in place.

In Letters Patent No. 255,364, granted Edward Weston, March 21, 1882, for a dynamo-electric machine, the armature is wound with two or more independent endless wires, and they are connected by loops to the commutator-segments, so as to avoid having any two adjacent strips of the commutator connected to loops from adjacent coils on the armature. Thus the armature is made to consist, so to speak, of two independent sets of coils.

In my invention herein the coils when completed form one continuous conductor, and, as shown in Fig. 2, the loops $c'$ $c'$ of the armature are opposite the loops $c^2 c^2$. Thus if the armature-coils are to be divided or distinguished according to the particular one of the two spools of wire from which the convolutions having the loops are taken in the process of forming the coils it would be found that half of the loops, as $c'$ $c'$, upon one side of the end of the armature would be of wire from a particular one of the two spools, while the other half of the loops—that is, on the opposite side or half of the commutator end of the armature, as loops $c^2 c^2$—will be formed of the particular wire taken from the other of the spools. When the coils or convolutions are all wound on and the two joints formed, the convolutions will then comprise one continuous conductor. The arrangement of the turns of this continuous conductor upon the face of the armature is illustrated in Fig. 3, previously described herein. Reference to this diagram, Fig. 3, will show that the different halves of any one turn—as, for example, 1 1—do not lie diametrically opposite each other, but are removed from the exact diametrical position by the width of one wire.

It will be understood that the wires might be wound on in reciprocal succession, as described, without forming the bends for attachment to the commutator-segments, in which case the commutator-segment attachments might be made in any well-known way. I therefore do not limit myself to my invention in certain of the claims to the special formation of the bends.

Having thus described my invention, I claim as new and desire to secure by Letters Patent—

1. An attachment between the segment of a commutator and a coil of the armature, consisting of a tang $g$, provided with shoulders forming steps, said tang being bound to its coil by a lashing of bare wire about the shoulders forming the steps and the wire of the coil, said tang being curved outwardly, substantially as and for the purpose specified.

2. The combination, in an armature, of coils or convolutions of wire forming a continuous conductor, said conductor consisting of two pieces of wire soldered together, each piece of wire containing the same number of convolutions and provided with loops, one with loops $c' c'$ on one side of the armature and the other with loops $c^2 c^2$ on the opposite side thereof, and the commutator having segments corresponding to and connected with the loops, substantially as and for the purpose specified.

3. The combination, with the armature-core, of coils wound thereon in uniform relation with respect to the different turns, the two halves of each turn upon the face of the armature being removed from diametrical position by the thickness of the wire, substantially as and for the purpose specified.

In witness whereof I hereunto subscribe my name this 5th day of September, A. D. 1889.

ERNEST P. WARNER.

Witnesses:
GEORGE P. BARTON,
CHARLES G. HAWLEY.